March 22, 1960 M. W. YOUNG 2,929,309
VACUUM FRAME MASK FOR PHOTOGRAPHIC REPRODUCTION
Filed Nov. 2, 1956 6 Sheets-Sheet 4
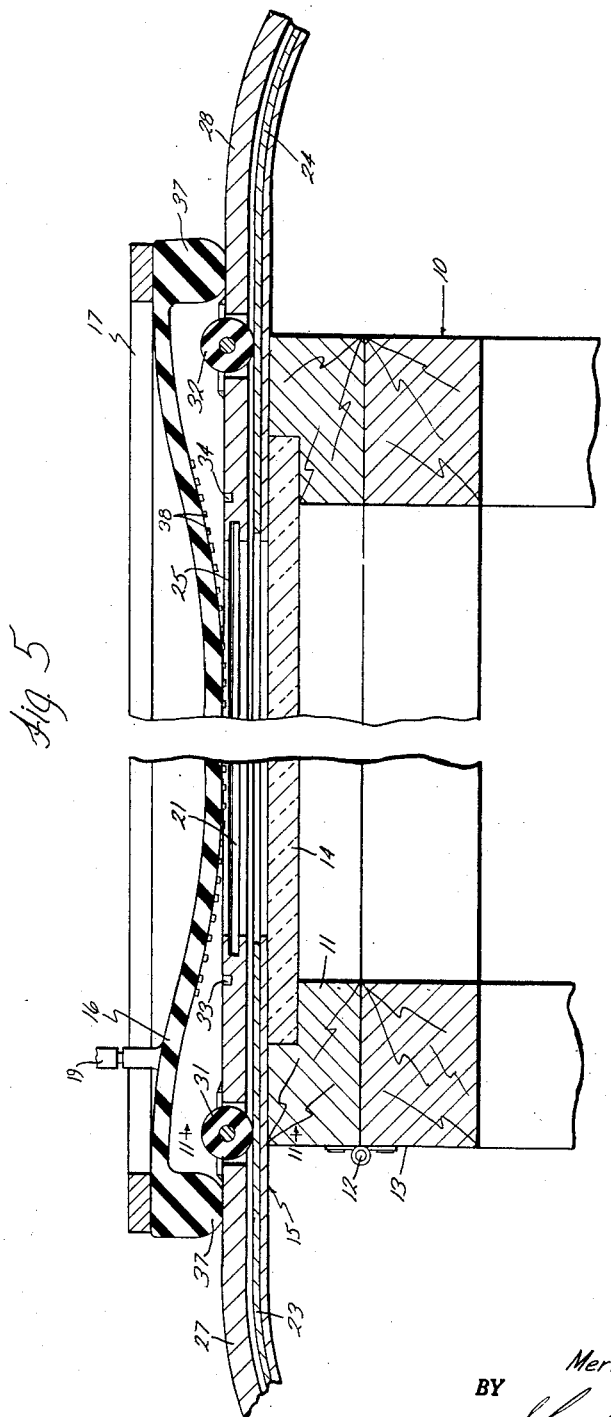
INVENTOR.
Mervin W. Young
BY
Atty.

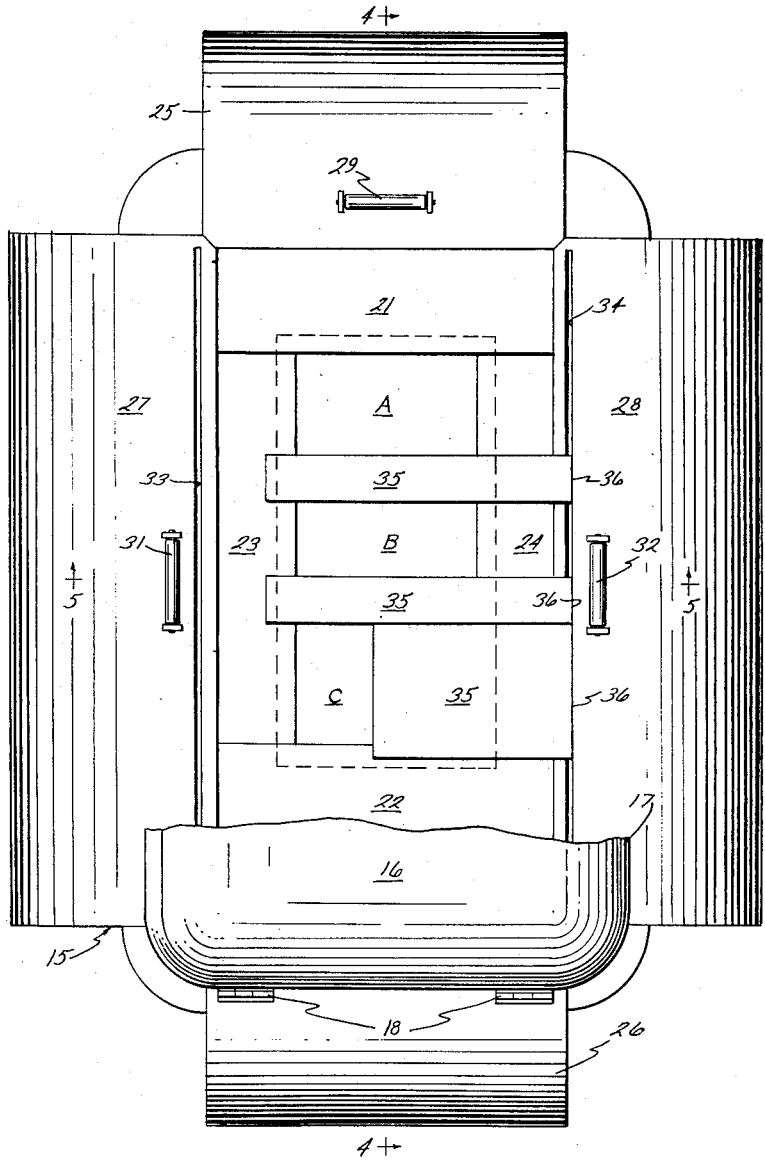

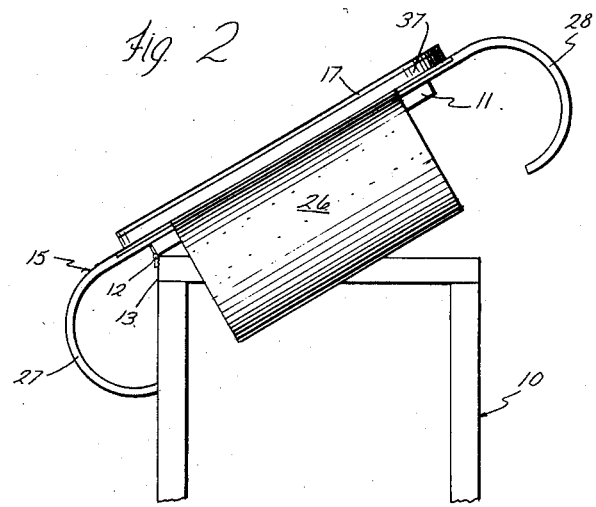
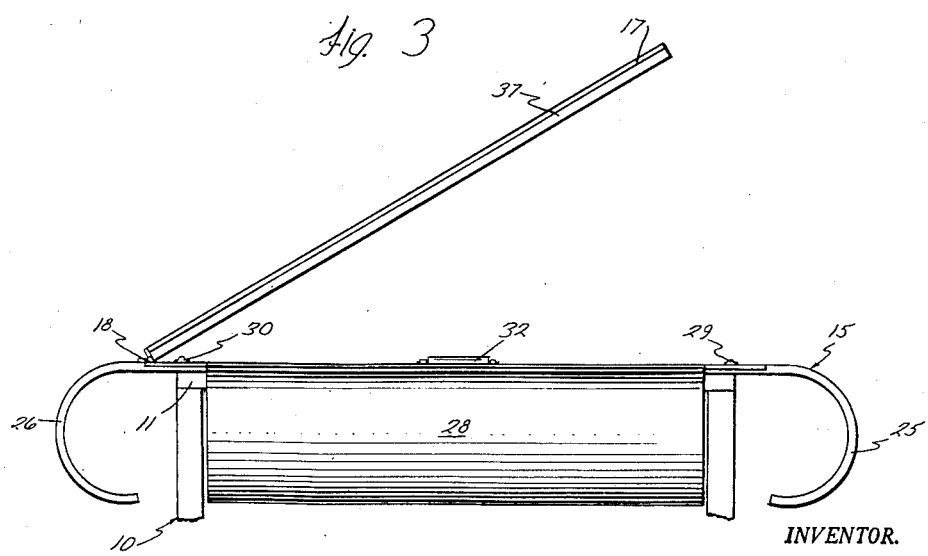

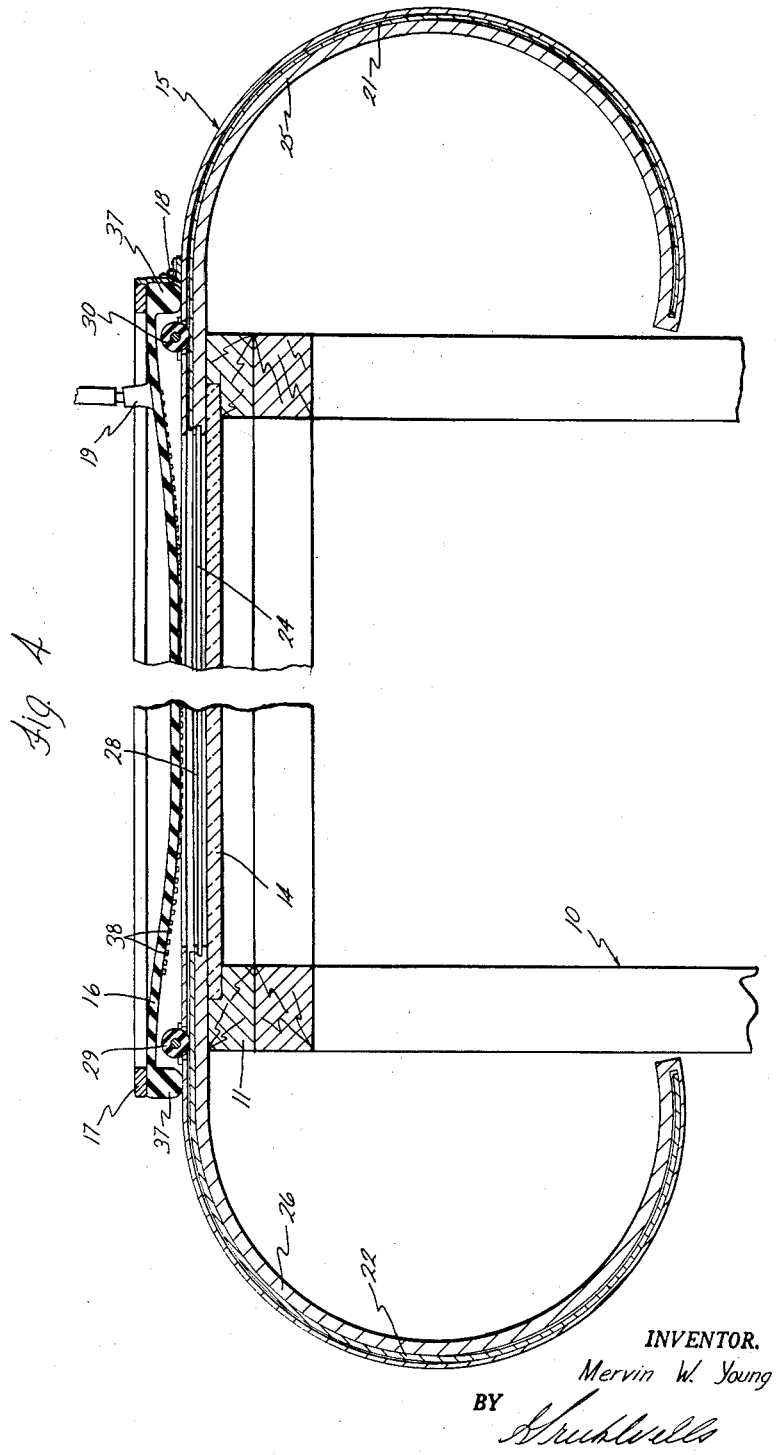

March 22, 1960   M. W. YOUNG   2,929,309
VACUUM FRAME MASK FOR PHOTOGRAPHIC REPRODUCTION
Filed Nov. 2, 1956   6 Sheets-Sheet 5
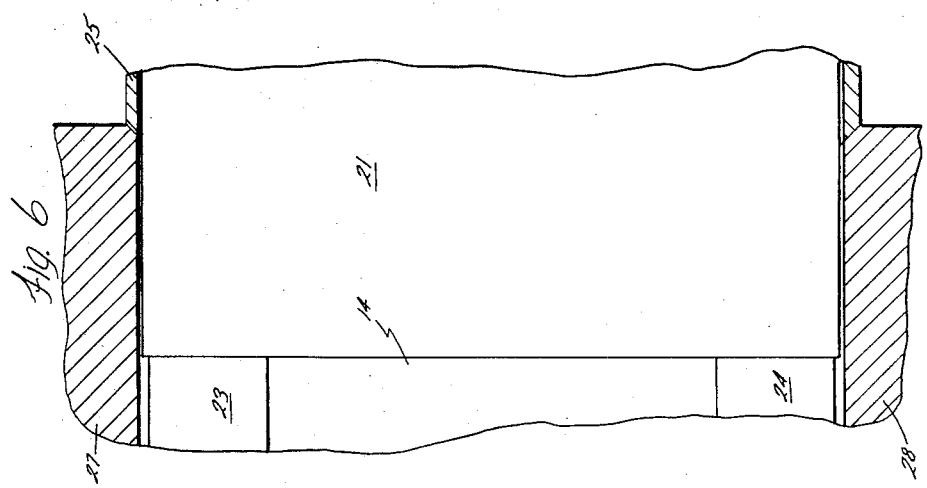
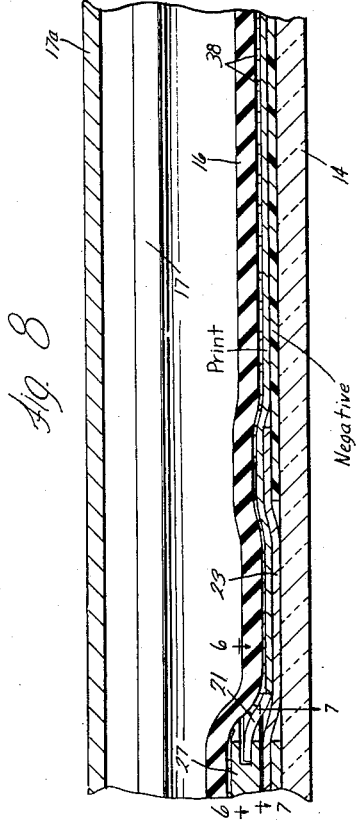
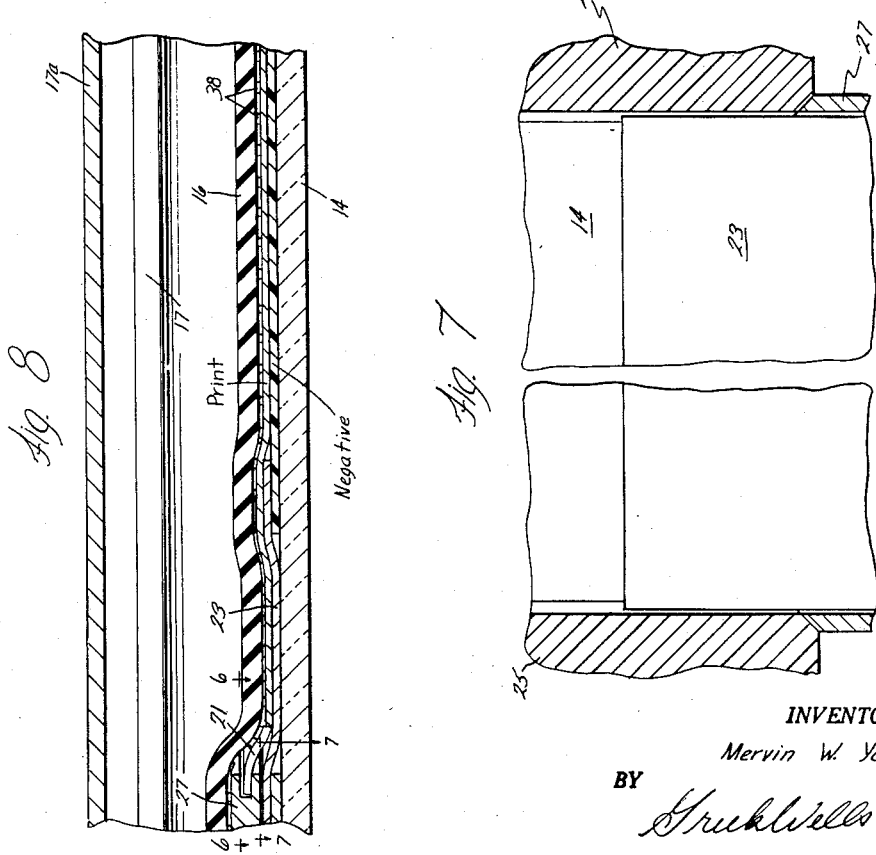
INVENTOR.
Mervin W. Young
BY
Truckwells
Atty.

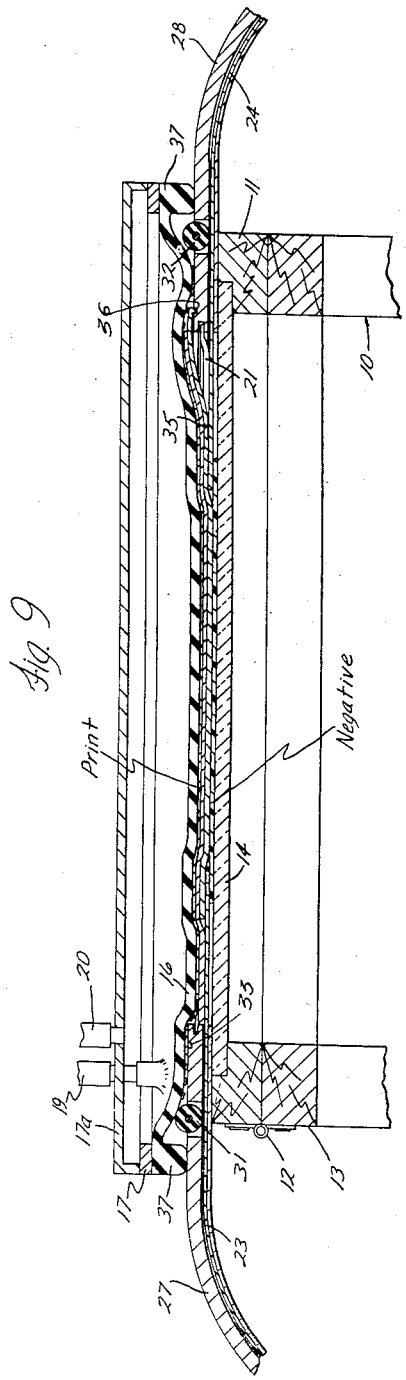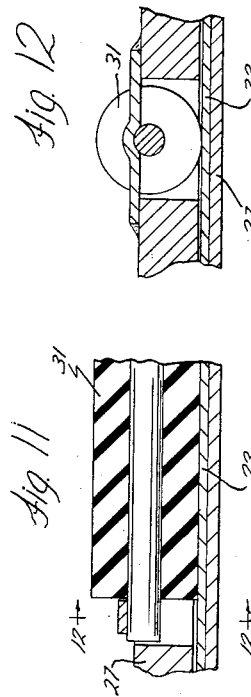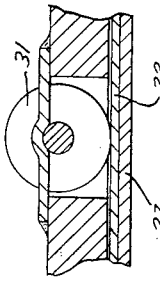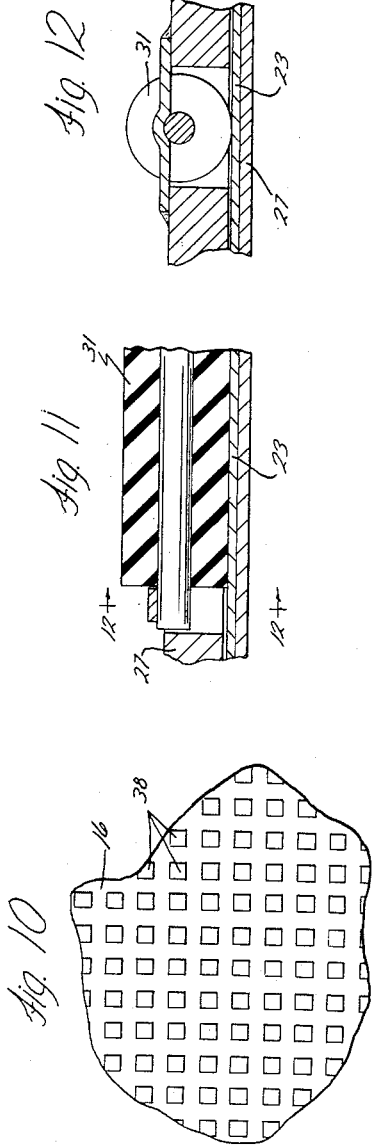

United States Patent Office 2,929,309
Patented Mar. 22, 1960

2,929,309

VACUUM FRAME MASK FOR PHOTOGRAPHIC REPRODUCTION

Mervin W. Young, Spokane, Wash.

Application November 2, 1956, Serial No. 619,989

7 Claims. (Cl. 95—77)

My invention relates to vacuum frames used in the printing art to make photographic reproductions from negatives. It is the principal purpose of my invention to provide a novel vacuum frame mask for photographic reproduction wherein the masking of those parts of the frame and of a negative in the frame is accomplished quickly and accurately by means of masks that slide into pockets along the edges of the glass, which pockets are covered by the vacuum frame so that they do not adversely effect the pressing of the light sensitive copy sheet down upon the negative and glass.

The nature and advantages of my invention, together with more detailed objects and advantages thereof, will be more fully understood from the following description and the accompanying drawings illustrating a preferred form of the invention. It should be understood, however, that the drawings and description are illustrative only and are not intended to limit the invention except insofar as it is limited by the claims.

In the drawings:

Figure 1 is a plan view of a photographic reproduction device embodying my invention;

Figure 2 is an end view of the device;

Figure 3 is a side view of the device;

Figure 4 is an enlarged sectional view taken on the line 4—4 of Figure 1;

Figure 5 is a further enlarged sectional view taken on the line 5—5 of Figure 1;

Figures 6 and 7 are fragmentary sectional views on an enlarged scale taken along horizontal lines indicated at 6—6 and 7—7 on Figure 8, illustrating how the masks enter their pockets, the blanket being removed;

Figure 8 is an enlarged fragmentary sectional view taken on the same line as Figure 5, but showing the device in operation with the vacuum blanket pressed firmly down against the elements therebeneath;

Figure 9 is a cross sectional view taken on the same line as Figure 5, showing the device in operation;

Figure 10 is a fragmentary detail view illustrating the face of the vacuum blanket;

Figure 11 is a fragmentary detail sectional view taken on the line 11—11 of Figure 5; and Figure 12 is a sectional view on the line 12—12 of Figure 11.

In the printing art, vacuum frames are used as a means of holding an undeveloped light sensitive sheet in intimate contact with a photographic negative which is placed on top of a glass sheet, with the negative and the print sheet so held, light is directed up through the glass for the exposure. In cases where the part of the negative to be reproduced occupies only a part of the space over the glass, it is necessary to apply a masking material to cover that part of the negative and glass that is not to be exposed. The print paper is then laid over the exposed part of the negative and the rubber blanket of the vacuum frame is laid over the entire assembly and pressed down by evacuating air from the space between the blanket and the glass. Air at atmospheric pressure on the outside or top of the blanket forces the blanket down toward the glass to hold the print paper tightly against the negative. Heretofore, the masking has been a slow painstaking operation usually requiring the cutting and pasting or otherwise placing the paper sheets used as masking material in position to expose only that part of the negative to be reproduced.

In work where a small strip of a negative is to be reproduced, it is often desirable to make several exposures of this negative upon a print so that in printing thereafter, several copies can be made in a single operation of the printing drum. This "step and repeat" exposure of the print is frequently used. According to my invention the masking operation is accomplished in such a way as to avoid the present laborious and exacting hand work now commonly necessary. In particular the step and repeat exposure is made in a fraction of the time heretofore considered necessary. Masking is more accurate and is not the messy operation it has been.

Referring now to the drawings in Figures 1 to 5 inclusive, there is illustrated a vacuum frame structure embodying my invention. A stand 10, which may contain the usual light source (not shown), has a glass holding rectangular framework 11 hinged thereto at 12 along the side edge 13 of the top of the stand 10. The framework 11 carries a transparent glass plate 14 on which the negative to be copied may be laid. For certain types of printing, such as half tone, the glass 14 may be suitably ruled. In accordance with my invention a masking frame indicated generally by the numeral 15 is secured on the framework 11. This masking frame 15 has a rectangular opening slightly smaller than the interior dimension of the framework 11. A vacuum blanket 16 is supported by another rectangular framework 17 which is hinged to the frame 15 at 18 so that it may be swung up out of the way when a negative and a light sensitive sheet are being placed on the glass 14. A suction connection 19 is shown for the blanket 16. I also utilize for pressing the blanket 16 in place a combination of vacuum and pressure as illustrated in Figure 9 where the framework 17 is closed by a cover 17a and a source of air under pressure is connected by a conduit 20 to the space between the blanket 16 and the cover 17a. With this assembly either vacuum or air pressure, or both, may be used to press the blanket against the work on the glass 14.

The most important part of my improved vacuum frame is embodied in the masking frame 15. This frame provides four freely adjustable masking sheets that are always present and that can be adjusted lengthwise and crosswise of the glass 14 to cover the glass and leave any desired rectangular part of a negative laid on the glass exposed. These masking sheets 21, 22, 23 and 24 are housed in four pockets 25, 26, 27 and 28 respectively, the pockets opening upon the rectangular control opening in the masking frame 15. The sheets 21, 22, 23 and 24, are very thin and resilient. Preferably they are made of a steel that is highly resistant to corrosion. The pockets 25, 26, 27 and 28 are all sealed except where they open upon the central opening and at the points mask sheet expelling rollers 29, 30, 31 and 32 are seated on the frame 15. The thin sheets 21–24 inclusive are quite flexible. Their thickness is greatly exaggerated in the drawings. Any suitable opaque sheets can be used but I have found the metal sheets quite satisfactory.

As illustrated the rollers 29, 30, 31 and 32 are all mounted within the area covered by the blanket 16 but they are also set back from the inner edge of the frame 15 so as not to interfere with the use of this part of the frame 15 as the rule frame of the vacuum frame. Suitable markings on the exposed surface of the frame 15 around its central opening are, of course, provided. In addition the frame 17 is slotted as indicated at 33 and 34 for the anchoring of special "furniture" pieces 35 that have down turned end edges 36. The "furniture" comprises a variety of masking strips 35, some of which may be long enough to extend all the way across the opening in the frame 15 while others are shorter. These strips are of various shapes and sizes to suit the printer's needs. Some of them are shown in place in Figure 1.

The vacuum blanket 16 is usually made of rubber. It has a rather heavy peripheral rib 37 which is adapted to rest upon the frame 15 and establish an air tight seal between the blanket and the frame. The lower surface of the blanket 16 is provided with a multiplicity of small spaced projections 38. The spaces between these projections maintain air circulation throughout the space beneath the blanket when the projections engage the various sheets on the glass 14.

In the use of my invention, assuming that the operator wishes to obtain a print of areas A, B and C (see Figure 1) only of a negative, he can place the negative on the glass 14 and by use of the rollers 29, 30, 31 and 32, he can move masking sheets 21–24 out to the positions shown, to block out or mask all of the glass 14 except the area between the exposed edges of the sheets 21–24. Then by using three "furniture" pieces 35, two of which extend all the way across the negative, he segregates portions A, B and C of the negative and covers the unwanted parts of the negative. Now by simply laying the light sensitive sheet on this assembly and by lowering the vacuum blanket 16 over it and withdrawing air from beneath it, the light sensitive sheet can be pressed down upon the masking pieces and the negative as illustrated in Figure 9. In this figure, which is taken substantially on the line 5—5 of Figure 1, the masking sheets 23 and 24 are shown as covering portions of the negative at each side. One masking strip 35 is shown overlying the negative and over this strip the light sensitive print paper is placed. The vacuum blanket overlies the assembly and presses the print paper down firmly against the masking sheets and the negative.

With my invention any desired rectangular portion of the negative can be printed by quickly setting the masking sheets 21–24 to cover the undesired portions of the negative, placing the print paper over the exposed part of the negative and pressing the print paper against the negative by means of the vacuum frame. Exposure then will transfer only the desired part of the negative to the print paper.

The enclosure of the masking sheets 21, 22, 23 and 24 in the sealed pockets 25, 26, 27 and 28 and the use of the rollers 29, 30, 31 and 32 to start the sheets out of the pockets speeds up the making of prints many times over the present commonly used method. There is more air to be exhausted from beneath the vacuum blanket but this does not slow up the process appreciably. Also, by using both vacuum beneath the blanket and air pressure over it, better contact between negative and print can be obtained.

Having thus described my invention, I claim:

1. In a device for making prints from negatives, having a transparent support for the negative and having a vacuum frame including a flexible blanket over the support operable to press a light sensitive sheet against the negative for exposure, the improvement comprising a masking frame positioned between the support and the blanket, said masking frame having a central aperture to receive the negative, said masking frame having sealed pockets opening to the edges of said aperture, and masking sheets seated in said pockets and movable out of the pockets over a negative laid on said support.

2. In a device for making prints from negatives having a transparent support for the negative and having a vacuum frame including a flexible blanket over the support operable to press a light sensitive sheet against the negative for exposure, the improvement comprising a masking frame positioned between the support and the blanket, said masking frame having a central aperture to receive the negative, said masking frame having sealed pockets opening to the edges of said aperture, and masking sheets seated in said pockets and movable out of the pockets over a negative laid on said support, the masking frame having means thereon extending into the pockets and engaging the masking sheets for initiating movement of the sheets out of their pockets.

3. In a device for making prints from negatives having a transparent support for the negative and having a vacuum frame including a flexible blanket over the support operable to press a light sensitive sheet against the negative for exposure, the improvement comprising a masking frame positioned between the support and the blanket, said masking frame having a central aperture to receive the negative, said masking frame having sealed pockets opening to the edges of said aperture, and masking sheets seated in said pockets and movable out of the pockets over a negative laid on said support, the masking frame having means in the top surface thereof for mounting masking strips.

4. In a device for making prints from negatives having a transparent support for the negative and having a vacuum frame including a flexible blanket over the support operable to press a light sensitive sheet against the negative for exposure, the improvement comprising a masking frame positioned between the support and the blanket, said masking frame having a central aperture to receive the negative, the masking frame comprising curved sealed pockets opening to the edges of said aperture and flexible masking sheets in said pockets movable out of the pockets across the top of the support.

5. In a device for making prints from negatives having a transparent support for the negative and having a vacuum frame including a flexible blanket over the support operable to press a light sensitive sheet against the negative for exposure, the improvement comprising a masking frame positioned between the support and the blanket, said masking frame having a rectangular aperture and having a pocket extending outwardly and downwardly from each edge of the aperture, each pocket containing a thin opaque masking sheet which is withdrawable from the pocket to extend over a portion of the support.

6. In a device for making prints from negatives having a transparent support for the negative and having a vacuum frame including a flexible blanket over the support operable to press a light sensitive sheet against the negative for exposure, the improvement comprising a masking frame positioned between the support and the blanket, said masking frame having a rectangular aperture and having a pocket extending outwardly and downwardly from each edge of the aperture, each pocket containing a thin opaque masking sheet which is withdrawable from the pocket to extend over a portion of the support, each pocket having a roller thereon operable to engage a sheet therein and move the sheet out of the pocket.

7. In a device for making prints from negatives having a transparent support for the negative and having a vacuum frame including a flexible blanket over the support operable to press a light sensitive sheet against the negative for exposure, the improvement comprising a masking frame positioned between the support and the blanket, said masking frame having a rectangular aperture and having a pocket extending outwardly and downwardly from each edge of the aperture, each pocket containing a thin opaque masking sheet which is withdrawable from the pocket to extend over a portion of the support, each pocket being vertically offset with respect to the adjacent pockets whereby to guide the sheet therein into overlapping relation with sheets from the adjacent pockets.

References Cited in the file of this patent

UNITED STATES PATENTS

| | | |
|---|---|---|
| 658,839 | Goddard | Oct. 2, 1900 |
| 708,770 | Johnson | Sept. 9, 1902 |
| 1,103,331 | Wallace | July 14, 1914 |
| 1,277,318 | Johnson | Aug. 27, 1918 |
| 2,173,168 | Hughes | Sept. 19, 1938 |
| 2,342,525 | Berry | Feb. 22, 1944 |
| 2,386,888 | Egelman | Oct. 16, 1945 |